United States Patent Office 3,352,922
Patented Nov. 14, 1967

3,352,922
NOVEL D-NOR-ESTRATRIENES AND PROCESSES FOR THEIR MANUFACTURE
Jerrold Meinwald, Ithaca, N.Y., assignor to Schering Corporation, Bloomfield, N.J., a corporation of New Jersey
No Drawing. Filed Feb. 25, 1965, Ser. No. 435,364
3 Claims. (Cl. 260—586)

This application is a continuation-in-part of copending application Ser. No. 165,952 of Jerrold Meinwald, filed Jan. 12, 1962, now abandoned.

This invention relates to a new class of steroidal derivatives, to methods for their manufacture, and to novel intermediates produced thereby. More specifically, this invention relates to D-nor-steroids of the estrane series which have useful properties, to processes for their preparation, and to D-nor-steroidal intermediates produced thereby.

The D-nor-steroids of my invention possess a carbon-skelton ring system as shown in Formula I:

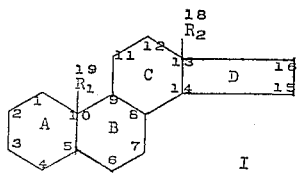

The rings are identified in the manner of conventional steroid nomenclature. Similarly, the carbon atoms of rings A, B, and C are conventionally identified. In ring D, C–17 is eliminated whereby C–16 is directly bonded to C–13. The angular groups attached to positions 10 and 13 retain conventional numbering, and as shown, $R_1$ and $R_2$ represent methyl or hydrogen.

In the conventional steroid nucleus, the six-membered C-ring is fused to the five-membered D-ring in the trans configuration. The D-nor-steroids of the instant invention also possess the trans configuration between the C-ring and the now contracted D-ring.

Heretofore, steroids having a four-membered cyclic D-ring were unknown. By my invention it is now possible to prepare a new class of four-membered D-ring steroids (i.e. D-nor-steroids), which are characterized by being devoid of a 17-carbon atom and by having attached to the 16-carbon atom, moieties which are identical to those substituted at C–17 of a normal steroid possessing a five-membered D-ring. My D-nor-steroids include D-nor-estranes having an oxygen function at the 16-carbon atom, which D-nor-estranes have been found, in general, to possess estrogenic activity, and to be valuable as intermediates in preparing other steroidal analogs.

The present invention provides a new class of D-nor-1,3,5(10)-estratrienes substituted at C–3 by a member selected from the group consisting of hydroxy, lower alkoxy, and an acyloxy radical of a hydrocarbon carboxylic acid having up to eight carbon atoms and at C–16 by a member selected from the group consisting of keto, (H,β-hydroxy), (H,β-lower alkanoyloxy), (α-lower alkyl, β-hydroxy), and (α-ethinyl, β-hydroxy).

By lower alkyl is contemplated hydrocarbon residues having up to 4 carbon atoms, thus including methyl, ethyl, n-propyl, isopropyl, n-butyl, sec-butyl and tertiary butyl.

Representative of the ester groups at C–3 included in the term "acyloxy radical" of a hydrocarbon carboxylic acid having up to 8 carbon atoms, are radicals of lower alkanoic acids such as formic, acetic, propionic and butyric; radicals of aromatic carboxylic acids such as benzoic and toluic acids; and radicals of dicarboxylic acids such as maleic, succinic, and phthalic acids. Also included are the alkaline earth and alkali metal salts of esters of dibasic acids, e.g. a sodium salt of hemisuccinate, phosphate, or sulfate ester.

This invention provides the following specific D-nor-1,3,5(10)-estratrienes: D-nor-estrone methyl ether, D-nor-estrone, D-nor-estradiol, 16α-methyl-D-nor-estradiol, and 16α-ethinyl-D-nor-estradiol.

D-nor-estrone methyl ether (D-nor-1,3,5(10)-estratriene-3-ol-16-one 3-methyl ether) is active as an antifertility agent via the oral route at 13 mg./kg. when tested in mature rats and also possesses estrogenic activity via the subcutaneous route in immature rats at 20 mg./kg.

D-nor-estrone methyl ether is also a valuable intermediate in preparing therapeutically valuable D-nor-19-nor-androstanes as described in my copending application, Ser. No. 165,952, filed Jan. 12, 1962, now abandoned. Thus, for example, D-nor-estrone methyl ether upon reduction with lithium in ammonia yields D-nor-2,5(10)-estradiene-3,16β-diol 3-methyl ether which, by the action of methanolic hydrochloric acid, is convertible to D-nor - 19 - nor-testosterone (i.e. D-nor-19-nor-4-androstene-16β-ol-3-one), which, in turn, may be oxidized by chromic acid by known methods to D-nor-19-nor-4-androstene-3,16-dione. Conversion of the 3-keto-function in the aforementioned 3,16-dione to a 3-pyrrolidyl eneamine derivative, for example, followed by reaction with sodium acetylide utilizing known techniques, then regeneration of the 3-keto-function by treatment with sodium acetate and acetic acid in methanol-water, yields 16α-ethinyl-D-nor - 19 - nor-testosterone, valuable as an antifertility agent.

D-nor-estrone (D-nor - 1,3,5(10) - estratriene-3-ol-16-one) possesses estrogenic activity and is also valuable as an intermediate in preparing the corresponding methyl ether discussed hereinabove.

D-nor-estradiol (D-nor - 1,3,5(10) - estratriene-3,16β-diol), 16α-methyl - D - nor-estradiol, and 16α-ethinyl-D-nor-estradiol possess estrogenic activity and are of value as cholesterol lowering agents. These 3-hydroxy-D-nor-estradiols may also be used as intermediates for the preparation of D-nor-19-nor-androstanes by converting the 3-hydroxy function to the 3-methyl ether derivative and going through a sequence of reactions similar to those known in the art for five-membered D-ring steroids as described hereinabove for estrone methyl ether.

The compounds of this invention, e.g. D-nor-estrone methyl ether, may be administered orally or parenterally, by incorporating a therapeutic dosage in a conventional dosage form such as tablets, capsules, elixers, suspensions, solutions, or the like. They can be administered in admixture with pharmaceutical excipients which are edible and chemically inert to the D-nor-estrones such as, for example, cornstarch, lactose, sucrose, gum arabic usually in admixture with an additive such as magnesium stearate, talc, and the like.

Oral compositions other than tablets may be used such as fine powders or granules of D-nor-estrone methyl ether and derivatives thereof, which compositions may contain diluents and dispersing and surface active agents, and may be presented in a syrup, or in capsules, or in non-aqueous suspensions, in aqueous suspensions, or in a syrup, or in an oil.

The D-nor-1,3,5(10)-estradienes are prepared from 16β-carboxy-D-nor-steroids such as D-nor-androstane-3β-ol- 16β-carboxylic acid by employing techniques analogous to methods known in the art for converting the carboxylic acid moiety in a C–17 carboxylic acid steroid (e.g. 5-androstene-3β-ol-17β-carboxylic acid) to a 17-keto, 17-hydroxy, 17-acetyl, or other 17-substituents of known, normal five-membered D-ring steroids; followed by aromatization of the A-ring by known procedures.

The 16β-carboxy-D-nor-steroids, necessary intermediates for the preparation of the novel D-nor-1,3,5(10)-estratrienes of this invention, are prepared from 17-keto-androstanes and 17-keto-estranes unsubstituted in the 16-position via my novel process as described in my U.S. Patent No. 3,113,142. In brief, this process is represented by the following reaction scheme A, wherein R represents the usual A, B, and C-rings of a steroid:

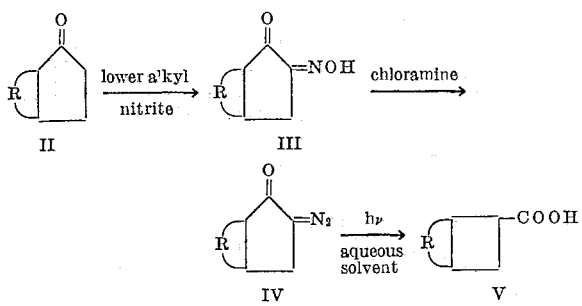

Exemplary of 16β-carboxy-D-nor starting compounds prepared as hereinabove are D-nor-androstane-3β-ol-16β-carboxylic acid, D-nor-androstane-3α-ol-16β-carboxylic acid, D-nor-androstane-3-one-16β-carboxylic acid, D-nor-4-androstene-3-one-16β-carboxylic acid, D-nor-5-androstene-3β-ol-16β-carboxylic acid, D-nor-4-androstene-3,11-dione -16β-carboxylic acid, D-nor-4-androstene-11β-ol-3-one-16β-carboxylic acid, D-nor-1,4-androstadiene-3,11-dione-16β-carboxylic acid, D-nor-1,4,9(11)-androstadiene-3-one-16β-carboxylic acid, 9α-fluoro-D-nor-1,4-androstadiene-11β-ol-3-one-16β-carboxylic acid, 6α-methyl-D-nor-1,4-androstadiene-3,11-dione - 16β - carboxylic acid, 6α-fluoro-D-nor-1,4-androstadiene - 3,11 - dione-16β-carboxylic acid and the like.

The D-nor-1,3,5(10)-estratrienes of this invention are conveniently obtained from 16β-carboxy-D-nor-androstanes as follows:

After protecting the hydroxyl group at C-3 by ester formation, 3β-hydroxy-16β-carboxy-D-nor-androstane, is first converted to the corresponding 16β-acid chloride by treatment with a reagent such as thionyl chloride, phosphorus trichloride, phosphorus pentachloride, and preferably oxalyl chloride. The thus formed acid chloride, e.g. 3β-acyloxy-16β-carbonyl chloride-D-nor-androstane, is, in turn, treated with an alkylating agent such as dimethyl cadmium, giving rise to the intermediary D-nor-steroid, e.g. D-nor-pregnane-3β-ol-2-one 3-acetate. Degradation of the D-nor-pregnane is effected by the Baeyer-Villiger oxidation using a per-acid such as perbenzoic acid or m-chloro-perbenzoic acid, and the resulting 3,16-diacetate ester of the intermediate D-nor-androstane-3β,16β-diol, when subjected to hydrolysis by means of potassium carbonate gives D-nor-androstane-3β,16β-diol, which, in turn, upon being subjected to the Jones-type oxidation with chromic/sulfuric acid reagent, is converted to D-nor-androstane-3,16-dione.

Treatment of D-nor-androstane-3,16-dione with bromine followed by dehyrobromination with dimethyl-acetamide utilizing known techniques yields the corresponding 1,4-bisdehydro analog, i.e. D-nor-1,4-androstadiene-3,16-dione, which upon pyrolysis at about 550° C. yields D-nor-estrone (D-nor-1,3,5(10)-estratriene-3-ol-16-one) which is convertible to the 3-methyl ether by reaction with methyl sulfate, or to D-nor-estradiol (D-nor-1,3,5(10)-estratriene-3,16β-diol) upon reduction with an agent such as sodium borohydride. Alternatively, the D-nor-1,3,5(10)-estratrienes are prepared by the 1,2-dehydrogenation of a 3-keto-Δ⁴-D-nor-19-androstane. Thus, for example, D-nor-19-nor-testosterone when subjected to the action of a 1,2-dehydrogenating microorganism such as *Corynebacterium simplex* (A.T.C.C. 6946) yields D-nor-estradiol (D-nor-1,3,5(10)-estratriene-3,16β-diol).

Derivatives of D-nor-1,3,5(10)-estratrienes prepared as described hereinabove are obtained by using procedures analogous to known methods for steroids of the C–17 series. Thus, D-nor-estrone upon reaction with sodium acetylide is converted to 16α-ethinyl-D-nor-1,3,5(10)-estratriene-3,16β-diol. When the 16α-(chloroethinyl) derivative is desired, a 16-keto-D-nor-steroid is reacted with lithium chloroacetylide (prepared from cisdichloro-ethylene and methyl lithium by known procedures) whereby the corresponding 16α-(chloroethinyl)16β-hydroxy-D-nor-steroid is formed.

Reaction of D-nor-estrone with a Grignard reagent such as methyl magnesium iodide or ethyl magnesium bromide according to known techniques yields the estrogenic compounds, 16α-methyl - D - nor-1,3,5(10)-estratriene-3,16β-diol and 16α-ethyl - D - nor-1,3,5(10)-estratriene-3,16β-diol, respectively.

The esters of my D-nor-steroids are prepared according to conventional techniques. Thus, lower alkanoyl esters are prepared by reacting the corresponding hydroxy compound with pyridine and an acid anhydride. For example, D-nor-estrone and D-nor-estradiol upon reaction with acetic anhydride in pyridine yields the corresponding acetate ester, i.e. D-nor-estrone 3-acetate (D-nor-1,3,5(10)-estratriene-3-ol-16-one 3-acetate), and D-nor-estradiol 3-acetate or 3,16-diacetate depending on the quantity of acetic anhydride used. By substituting other lower alkanoic acid anhydrides such as propionic anhydride or caproic anhydride, there is obtained the corresponding propionate or caproate ester.

It is to be understood that, in the specification and in the examples, the conversions shown are by way of illustration only, it being obvious to one skilled in the art that analogous transformations may be carried out when other intermediates are used.

When preparing D-nor steroids of this invention which are substituted at one or more of carbon atoms 2, 4, 6, 9, 11, and 15, for example, it is preferable to have all the substituents in the 16β-carboxy-D-nor steroid starting intermediate. However, substituents may be introduced in the molecule at any point during the preparation of the D - nor - 1,3,5(10) - estratrienes by utilizing procedures known in the art. D-nor-1,3,5(10)-estratrienes having the following additional groups may be prepared:

Hydroxy or acyloxy groups at one or more positions such as at C–6 and C–15;

Alkyl group containing up to 4 carbon atoms, and particularly methyl at one or more of positions such as at C–1, 2, 4, 6, and C–15;

Lower alkylene groups and particularly methylene at positions such as at C–15;

Halogeno groups and particularly fluorine and chlorine such as at positions 6 and 15; and Unsaturated linkages.

The process of this invention may be used in the preparation of the following D-nor-1,3,5(10)-estratrienes or derivatives thereof such as those having additional substituents as disclosed in the preceding paragraph, which derivatives are also estrogenic and are valuable as intermediates and are considered the equivalents of the following:

D-nor-estrone
D-nor-estrone methyl ether
D-nor-estrone acetate
D-nor-estrone propionate
D-nor-estrone caproate
D-nor-estradiol
16α-ethinyl-D-nor-estradiol
16α-chloroethinyl-D-nor-estradiol
16α-methyl-D-nor-estradiol
16α-ethyl-D-nor-estradiol The following are examples which illustrate my invention. It is to be understood that the invention is not to be limited to the exact details of operation or exact compounds shown and described as obvious modifications and equivalents will be apparent to one skilled in the art; the invention is therefore to be limited only by the scope of the appended claims.

EXAMPLE 1

D-nor-androstane-3β,16β-diol

A. D-NOR-ANDROSTANE-3β-OL-16β-CARBOXYLIC ACID 3-ACETATE

To 400 mg. of D-nor-androstane-3β-ol-16β-carboxylic acid in 5 ml. of pyridine add 0.5 ml. of acetic anhydride and allow the solution to stand overnight at room temperature. Dilute the reaction mixture with ether and extract the ethereal solution with 0.1 N aqueous sodium hydroxide. Neutralize with cold hydrochloric acid, filter the resultant precipitate, wash with water, and recrystallize from acetone-water. Collect the precipitate, D-nor-androstane-3β-ol-16β-carboxylic acid 3-acetate on a filter and dry.

B. D-NOR-ANDROSTANE-3β-OL-16β-CARBOXYLIC ACID CHLORIDE 3-ACETATE

Reflux for 1 hour a mixture of 2.63 g. of D-nor-androstane-3β-ol-16β-carboxylic acid 3-acetate and 2.5 g. of oxalyl chloride in 20 ml. of dry benzene then distill in vacuo the excess oxalyl chloride and benzene. The residue substantially of D-nor-androstane-3β-ol-16β-carboxylic acid chloride 3-acetate is used without further purification in the reaction immediately following.

C. D-NOR-5α-PREGNANE-3β-OL-20-ONE 3-ACETATE (16β-ACETYL-D-NOR-ANDROSTANE-3β-OL 3-ACETATE)

Prepare two equivalents of dimethyl cadmium in benzene according to the procedure in F. A. Shirley, "Organic Reactions," vol. VIII, John Wiley and Sons, Inc., New York, N.Y. (1954). Add this benzene solution of dimethyl cadmium slowly and dropwise to a well stirred solution of the acid chloride prepared in Example 1B in 50 ml. of dry benzene. Stir the resultant mixture for 1 hour and then reflux for 15 minutes.

Acidify the reaction mixture, then extract with ether. Combine the ethereal extracts, wash with 3 N hydrochloric acid, water, then with sodium bicarbonate solution, and dry over magnesium sulfate. Evaporate the ether and chromatograph the resultant residue over Woelm neutral alumina, activity grade III, eluting with 7:3 hexane-benzene. Combine the eluates and evaporate to a residue of D-nor-5α-pregnane-3β-ol-20-one 3-acetate. Purify by recrystallization from hexane.

D. D-NOR-ANDROSTANE-3β,16β-DIOL DIACETATE

Prepare a solution of 280 mg. of D-nor-5α-pregnane-3β-ol-20-one 3-acetate and 112 mg. of perbenzoic acid in 2 ml. of chloroform and allow the solution to stand in the dark for 8 days at room temperature. Dilute the reaction mixture with ether and wash the organic solution with sodium carbonate and water. Dry the solution over magnesium sulfate, filter, and evaporate, chromatograph the resultant residue over Woelm neutral alumina, activity grade III, in hexane and elute with 1:1 hexane-benzene. Combine the eluates and distill the hexane-benzene in vacuo to a residue substantially of D-nor-androstane-3β,16β-diol diacetate. Purify by subliming the residue and recrystallizing the sublimate product from aqueous ethanol.

E. D-NOR-ANDROSTANE-3β,16β-DIOL

Reflux for 2 hours a mixture of 200 mg. of D-nor-androstane-3β,16β-diol diacetate and 200 mg. of potassium carbonate in 40 ml. of 3:1 methanol-water. Dilute the reaction mixture with water and filter to give a residue of D-nor-androstane-3β,16β-diol. Purify the residue by chromatography of Woelm neutral alumina, activity grade III, in ether eluting with 6% acetone in ether followed by recrystallization with aqueous methanol.

Alternatively, D-nor-androstane-3β,16β-diol and the diacetate ester thereof are also prepared as follows:

Prepare a trifluoroperacetic acid solution by adding 2.75 ml. of trifluoroacetic anhydride to 0.42 ml. of 90% hydrogen perovide in 15 ml. of methylene chloride. Add 10 ml. of this trifluoroperacetic acid solution to a mixture of 1.2 g. of D-nor-5α-pregnane-3β-ol-20-one 3-acetate and 3.2 g. of disodium hydrogenphosphate in 25 ml. of methylene chloride. Reflux the mixture overnight, then add 3.2 g. more of disodium hydrogenphosphate and the remaining trifluoroperacetic acid solution. Reflux the mixture for an additional 6 hours, then cool, wash the reaction mixture three times with water and dry the methylene chloride solution over magnesium sulfate, filter, and evaporate to a residue substantially of D-nor-androstane-3β,16β-diol diacetate, which is used without further purification in the procedure immediately following.

Into ice cold ether place 1.1 g. of the diacetate product prepared above and a molar excess of lithium aluminum hydride. Stir the reaction mixture for 2.5 hours, then decompose the excess hydride by the addition of water, then filter the salts from the ether solution. Wash the ether solution with 3 N hydrochloric acid, then water, and finally sodium bicarbonate solution, dry the solution over magnesium sulfate, filter and evaporate to a residue of D-nor-androstane-3β,16β-diol.

F. D-NOR-ANDROSTANE-3,16-DIONE

To an ice cold solution of 0.36 g. of D-nor-androstane-3β,16β-diol in 10 ml. of pyridine add 0.45 g. of chromium trioxide in 5 ml. of ice cold pyridine. Allow the reaction mixture to warm up to room temperature and stir for 36 hours. Add water and extract the reaction mixture with ether. Wash the ethereal solution with 3 N hydrochloric acid, water and sodium bicarbonate solution. Dry the ether solution over magnesium sulfate and evaporate to a residue substantially of D-nor-androstane-3,16-dione. Purify by chromotographing over Woelm neutral alumina, activity grade III, eluting with 1:1 hexane-benzene. Combine the eluates and evaporate to a residue, recrystallize the residue from ether.

EXAMPLE 2

D-nor-estrone (D-nor-1,3,5(10)-estratriene-3-ol-16-one)

A. 2,4-DIBROMO-D-NOR-ANDROSTANE-3,16-DIONE

To a solution of 1 g. of D-nor-androstane-3,16-dione in 10 ml. of acetic acid at room temperature add 0.2 ml. of 4 N hydrogen bromide in acetic acid followed by 18.3 ml. of a solution of 1.6 g. of bromide in 25 ml. of acetic acid. After disappearance of the bromine color, warm the solution to 50° C. and allow it to stand at room temperature for 4 hours. Carefully dilute the solution with water and filter the resultant precipitate, wash well with water, and dry, to give 2,4-dibromo-D-nor-androstane-3,16-dione. Purify by crystallization from acetone-hexane.

B. D-NOR-1,4-ANDROSTADIENE-3,16-DIONE

Heat to reflux temperature a suspension of 1 g. of anhydrous calcium carbonate in 10 ml. of dimethylacetamide. Then add 1 g. of 2,4-dibromo-D-nor-androstane-3,16-dione and reflux the mixture for 15 minutes. Cool and pour the reaction mixture into cold 1 N hydrochloric acid. Filter the resultant precipitate, wash with water, and dry to give D-nor-1,4-androstadiene-3,16-dione. Purify by recrystallization from acetone-hexane.

C. D-NOR-ESTRONE

Pass a suspension of 5 g. of D-nor-1,4-androstadiene-3,16-dione in 250 ml. of mineral oil through a Vycor glass column filled with Pyrex glass helices heated to about 550° C. at a rate of 10 ml./min. in a nitrogen atmosphere. Collect the effluent in an ice-cooled receiver, dilute with hexane and extract with 5% aqueous sodium hydroxide. Acidify the extracts with diluted hydrochloric acid and filter the resultant precipitate, wash with water, and dry to give D-nor-estrone. Purify by crystallizing from ethyl acetate after treating the ethyl acetate solution with decolorizing charcoal.

D. D-NOR-ESTRONE ACETATE

Allow to stand overnight at room temperature a solution of 1 g. of D-nor-estrone in 10 ml. of pyridine and 1 ml. of acetic anhydride. Pour the reaction mixture into 100 ml. of water and filter the resultant product comprising D-nor-estrone acetate. Purify by crystallization from acetone-hexane.

By substituting propionic anhydride or caproic anhydride for acetic anhydride in the above procedure, there is obtained the corresponding 3-propionate and 3-caproate ester, respectively, of D-nor-estrone.

EXAMPLE 3

*D-nor-estrone methyl ether*

(D-NOR-1,3,5(10)-ESTRATRIENE-3-OL-16-ONE 3-METHYL-ETHER)

Add 3 ml. of dimethyl sulfate to a stirred solution of 3 g. of D-nor-estrone and 18 g. of potassium hydroxide in a mixture of 150 ml. of methanol and 30 ml. of water. At 30 minute intervals, add three additional 3 ml. portions of dimethyl sulfate, then stir the solution an additional hour. Remove most of the solvent in vacuo then add water and filter the resultant precipitate. The precipitate is washed well with water and dried to give D-nor-estrone methyl ether. Purify by crystallization from aqueous methanol.

EXAMPLE 4

*D-nor-estradiol*

(D-NOR-1,3,5(10)-ESTRATRIENE-3,16β-DIOL)

To a solution of 1 g. of D-nor-estrone in 30 ml. of methanol chilled in an ice bath, add 250 mg. of sodium borohydride. After completion of addition keep the mixture at room temperature for 2 hours then dilute with water and carefully acidify with hydrochloric acid. Filter the resulting precipitate, wash with water, and dry to give D-nor-estradiol. Purify by crystallization from aqueous methanol.

Treat D-nor-estradiol with acetic anhydride in pyridine in the manner desbribed in Example 2D to obtain D-nor-estradiol diacetate.

Similarly, by substituting propionic and caproic anhydride for acetic anhydride in the above procedure, there is obtained corresponding dipropionate and dicaproate, respectively, of D-nor-estradiol.

EXAMPLE 5

*16α-ethinyl-D-nor-estradiol*

(16α-ETHINYL-D-NOR-1,3,5(10)-ESTRATRIENE-3,16β-DIOL)

To a solution of 500 mg. of D-nor-estrone in 10 ml. of dimethylsulfoxide add a suspension, in 3 ml. of dimethylsulfoxide, of sodium acetylide obtained by centrifugation of 1.5 ml. of 18% sodium acetylide in xylene. Stir the mixture at 20° C. for 15 minutes, then pour into ice water and acidify with dilute hydrochloric acid. Filter the resulting precipitate, wash with water, and dry to give 16α-ethinyl-D-nor-estradiol. Purify by crystallization from acetone-hexane.

EXAMPLE 6

*Alternate procedure for the preparation of D-nor-estradiol*

A. D-NOR-2,5(10)-ESTRADIENE-3,16β-DIOL 3-METHYL ETHER

To a stirred solution of 1 g. of D-nor-estrone methyl ether in 100 ml. of ether and 100 ml. of liquid ammonia at about −60° C. add 1 g. of lithium metal in small pieces. To the resulting blue solution add dropwise 32 ml. of ethanol over a period of about 50 minutes. Allow the decolorized solution to evaporate, add water to the residue and extract with ether. Combine the ether extracts, wash with water, dry over magnesium sulfate, and concentrate to a residue of D-nor-2,5(10)-estradiene-3,16β-diol-3-methyl ether. Purify by crystallization from acetone-hexane.

B. D-NOR-19-NOR-TESTOSTERONE (D-NOR-19-NOR-4-ANDROSTENE-16β-OL-3-ONE)

Heat under reflux for 20 minutes a solution of 200 mg. of D-nor-2,5(10)-estradiene-3,16β-diol - 3 - methyl ether (the compound of Example 9A) in 50 ml. of 90% aqueous methanol containing 0.5 ml. of concentrated hydrochloric acid. Cool the reaction mixture and concentrate in vacuo. Add cold water to the residue, filter the resulting precipitate, wash with water, and dry to give D-nor-19-nor-testosterone. Purify by crystallization from acetone-hexane.

C. D-NOR-ESTRADIOL

D-nor-19-nor-testosterone is subjected to the action of a culture of *Corynebacterium simplex* (A.T.C.C. No. 6946) in the following manner.

A solution of 1 g. of yeast extract (Difco) in one liter of tap water, the pH of which is adjusted to 6.9 is distributed among ten 300 ml. Erlenmeyer flasks and to each flask is added a loopful, 2 ml., of *Corynebacterium simplex*. The resulting suspensions are incubated at 30° C. on a shaking machine for 18 hours. One-half gram of D-nor-19-nor-testosterone is dissolved in 25 ml. of acetone and the resulting solution is distributed equally among the ten flasks containing the 18-hour growth of *C. simplex*. The culture containing the D-nor-19-nor-4-pregnene-3,20-dione is then incubated at 30° C. for 24 hours. At the end of 24 hours, the contents of the flasks are combined and extracted with a total of 3 liters of chloroform. The crude chloroform extract from the transformation is then concentrated to a residue which is crystallized from methylene chloride-hexane, affording D-nor-estradiol.

I claim:
1. 3-OR-16X-D-nor-1,3,5(10)-estratriene wherein R is a member selected from the group consisting of hydrogen, lower alkanoyl, and lower alkyl; and wherein X is a member of the group consisting of keto, (H,β-hydroxy), (H,β-lower alkanoyloxy), (α-methyl, β-hydroxy) and (α-ethinyl, β-hydroxy).

2. A compound according to claim 1 wherein R is methyl and X is keto, said compound being D-nor-estrone methyl ether.

3. A compound according to claim 1 wherein R is hydrogen and X is keto, said compound being D-nor-estrone.

References Cited

Cava et al., J. Am. Chem. Soc., vol. 84, pp. 115 and 116 (1962).

Fieser et al., "Steroids," pp. 470 and 471 (1959).

Mateos et al., "Boletin Del Institute De Quimica, U.N.A.M.," vol. 13, pp. 3–5 (1961).

Meinwald et al., J. Am. Chem. Soc., vol. 84, pp. 116 and 117 (1962).

Stecher et al., "The Merck Index," pp. 418 and 419 (1960).

Zondek et al., "J. Biochem.," vol. 32, pp. 32, 641–5 (1938).

LEON ZITVER, *Primary Examiner.*

M. JACOB, *Assistant Examiner.*